US008157088B2

(12) United States Patent
Barrett et al.

(10) Patent No.: US 8,157,088 B2
(45) Date of Patent: Apr. 17, 2012

(54) MEDIA STORAGE CONTAINER, APPARATUS AND METHOD

(75) Inventors: Tod Alan Barrett, Austin, TX (US); Ronald Eugene Hunt, Georgetown, TX (US); Verlon Eugene Whitehead, Austin, TX (US)

(73) Assignee: CD3, Inc., Austin, TX (US)

( * ) Notice: Subject to any disclaimer, the term of this patent is extended or adjusted under 35 U.S.C. 154(b) by 699 days.

(21) Appl. No.: 11/762,505

(22) Filed: Jun. 13, 2007

(65) Prior Publication Data
US 2008/0308435 A1 Dec. 18, 2008

(51) Int. Cl.
B65D 85/57 (2006.01)

(52) U.S. Cl. ........... 206/307.1; 206/308.1; 312/9.11; 312/9.14; 312/9.15

(58) Field of Classification Search ........... 206/307, 206/307.1; 211/40, 1.51, 41.12; 312/9.34, 312/9.36, 9.37, 9.43, 9.44, 9.29, 9.32, 9.33, 312/9.38, 9.41, 9.42, 9.45, 9.58, 9.59, 9.61, 312/9.11–9.28
See application file for complete search history.

(56) References Cited

U.S. PATENT DOCUMENTS

| | | | | |
|---|---|---|---|---|
| 2,902,327 A * | 9/1959 | Larsen | | 312/9.43 |
| 3,446,360 A * | 5/1969 | Gutierrez | | 211/40 |
| 3,716,145 A * | 2/1973 | Gutierrez | | 211/40 |
| 3,794,394 A * | 2/1974 | Berggren | | 312/9.34 |
| 3,866,990 A * | 2/1975 | McRae | | 312/9.25 |
| 3,889,812 A * | 6/1975 | Gutierrez | | 211/1.51 |
| 4,630,732 A * | 12/1986 | Snyman | | 206/445 |
| 4,664,454 A * | 5/1987 | Schatteman et al. | | 312/9.19 |
| 4,763,962 A * | 8/1988 | Ackeret | | 312/9.32 |
| 4,875,743 A * | 10/1989 | Gelardi et al. | | 312/9.42 |
| 5,101,972 A * | 4/1992 | Hunt et al. | | 206/308.1 |
| 5,232,275 A * | 8/1993 | Yamazoe | | 312/9.58 |
| 5,275,480 A * | 1/1994 | Hyman et al. | | 312/9.14 |
| 5,476,172 A * | 12/1995 | Hunt et al. | | 206/308.1 |
| 5,503,470 A * | 4/1996 | Lu | | 312/9.34 |
| 5,584,544 A * | 12/1996 | Kuzara | | 312/9.36 |
| 5,683,153 A | 11/1997 | Ohta | | |
| 5,690,221 A * | 11/1997 | Yeh | | 206/308.1 |
| 5,833,062 A * | 11/1998 | Yeh | | 206/307.1 |
| 6,003,855 A | 12/1999 | Beaufort et al. | | |
| 6,048,042 A * | 4/2000 | Chan | | 312/9.11 |
| 6,279,753 B1 | 8/2001 | Swanson | | |
| 6,332,656 B1 * | 12/2001 | Gaves | | 312/9.14 |
| 6,386,655 B1 * | 5/2002 | Hung et al. | | 312/9.42 |
| 6,427,849 B2 * | 8/2002 | Swan | | 211/40 |
| 6,860,572 B1 | 3/2005 | Pages | | |
| 6,874,626 B2 * | 4/2005 | Lew et al. | | 206/308.1 |
| 6,905,033 B2 * | 6/2005 | Bennett et al. | | 211/40 |
| 7,195,324 B2 * | 3/2007 | Chan | | 312/9.38 |

OTHER PUBLICATIONS

International Application No. PCT/US08/67238, International Search Report dated Dec. 12, 2008.

(Continued)

Primary Examiner — J. Gregory Pickett
Assistant Examiner — Raven Collins
(74) Attorney, Agent, or Firm — Yudell Isidore Ng Russell PLLC

(57) ABSTRACT

A media storage apparatus includes a frame, a shaft, and a plurality of retainers for retaining a plurality of portable planar storage media. The plurality of retainers is supported by the shaft and rotatable about the shaft from a selectable position to a selected position. The apparatus further includes a retainer selection mechanism, coupled to the frame, that traverses the frame to cause selected ones of the plurality of retainers traversed by the retainer selection mechanism to rotate in sequence from the selectable position to the selected position.

17 Claims, 12 Drawing Sheets

OTHER PUBLICATIONS

Written Opinion of the International Searching Authority for International Application No. PCT/US08/67238 mailed Dec. 12, 2008.

International Preliminary Report on Patentability for International Application No. PCT/US08/67238 mailed Dec. 30, 2009.

* cited by examiner

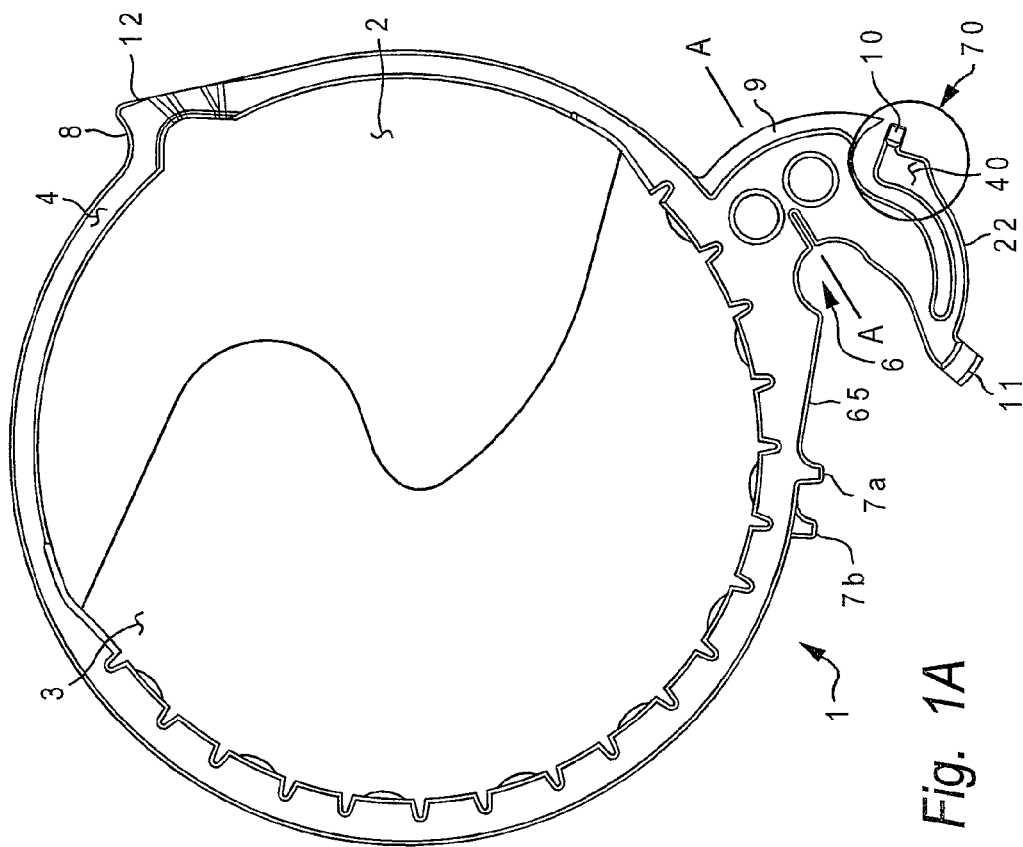
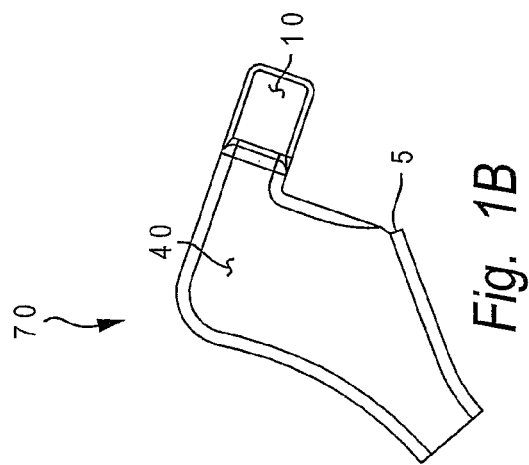

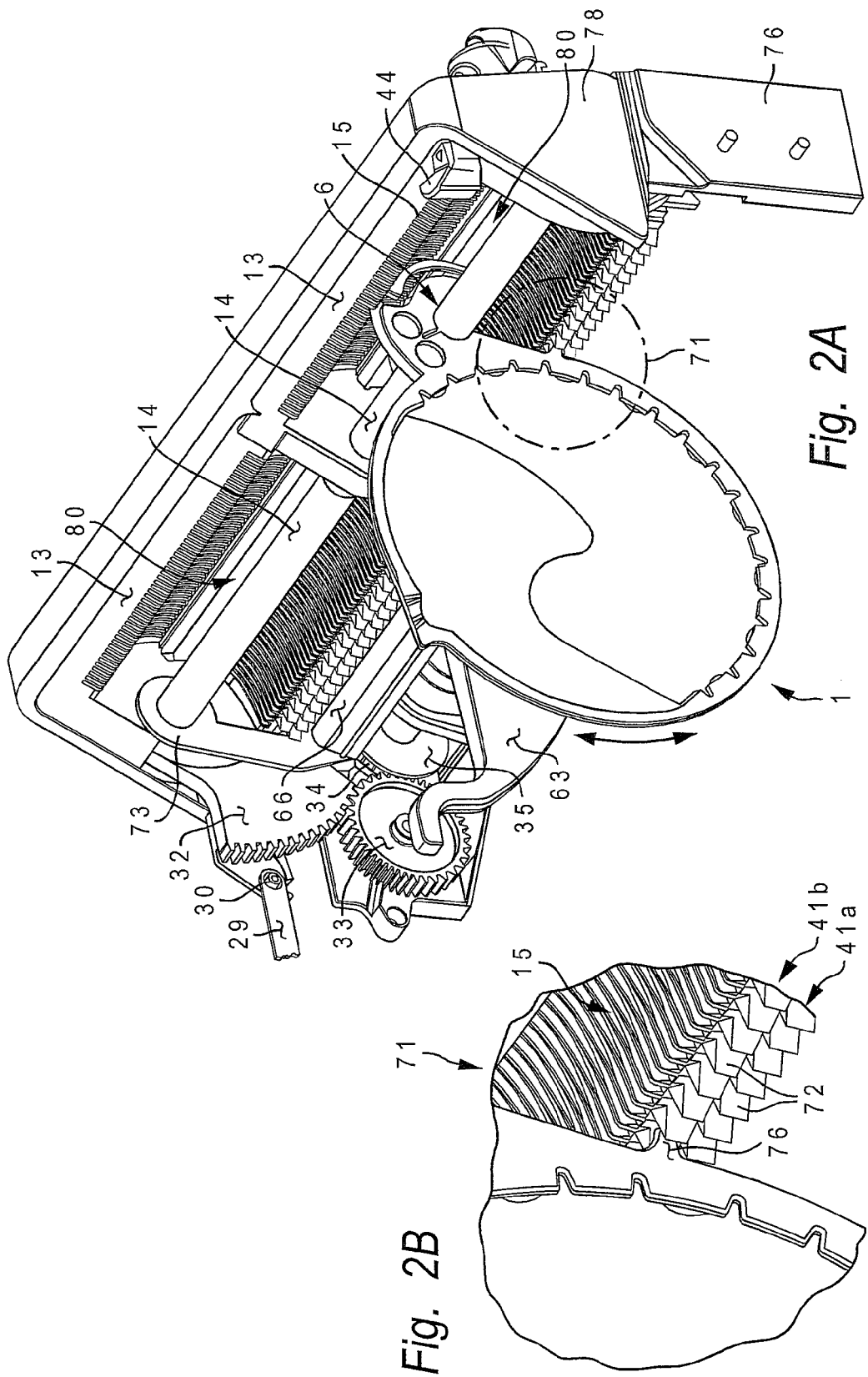

MEDIA STORAGE CONTAINER, APPARATUS AND METHOD

BACKGROUND OF THE INVENTION

1. Technical Field

The present invention relates in general to media storage.

2. Description of the Related Art

A variety of media storage products are utilized to store planar portable storage media, such as disc storage media like compact discs (CDs) and digital versatile discs (DVDs). In general, portable media storage products can be classified as one of three types, namely, media wallets (also referred to as media binders), case storage systems, and case-less storage containers.

Although realized in a variety of form factors, media wallets generally have rigid or semi-rigid protective covers between which are retained a number of flexible pages. One or both sides of a page contain pockets for storing a portable storage media. The pockets often have at least one protective, non-scratching surface to protect the portable storage media from scratching. In order to access a desired portable storage medium, a person manually turns the pages of the media wallet, visually scanning the text or artwork on the upper, non-encoded surfaces of portable storage media until the desired portable storage medium is reached. The portable storage medium can then be removed from its pocket for use. Although media wallets have fairly high storage densities, many consumers find accessing desired portable storage media within a media wallet to be laborious task. In addition, some consumers find media wallets unsuitable for public display and therefore prefer other media storage products on an aesthetic basis.

Case storage systems generally comprise drawers, shelves, or racks of various configurations for storing portable storage media in their original retail protective cases (e.g., a CD jewel case or DVD case). In order to access a desired portable storage medium, a person visually scans the text or artwork on the spines of the media cases until the case for the desired portable storage medium is located. The portable storage medium must then be removed from its protective case prior to use. A principal disadvantage of case storage systems is that they offer relatively low storage density because a majority of the storage space provided by a case storage system is utilized for storing the protective cases of the portable storage media. In addition, many consumers do not prefer case storage systems because of the lack of aesthetic appeal of a large visible collection of protective media cases.

Case-less storage containers provide storage of multiple portable storage media within a variety of enclosures. Within the enclosure, each individual portable storage medium (e.g., disc) is generally retained within a sleeve or on a hub that engages the surfaces of the central through-hole of a disc storage medium. Some case-less storage containers provide movable internal members to permit a user to scan for a desired portable storage medium. Because the case-less storage containers do not store the retail protective cases of the portable storage media, case-less storage containers (like media wallets) can achieve a relatively high storage density. In addition, case-less storage containers often offer a higher aesthetic appeal in that a variety of materials and design elements can be incorporated into the exterior of the containers. However, despite the availability of case-less storage containers having movable internal members, users may still find it laborious to insert and retrieve portable storage media from case-less storage containers, particularly those achieving higher storage densities.

SUMMARY OF THE INVENTION

In view of the foregoing, the present invention provides improved methods, apparatus, and systems for storing and retrieving portable storage media, such as disc storage media.

A media storage apparatus includes a frame, a shaft, and a plurality of retainers for retaining a plurality of portable planar storage media. The plurality of retainers is supported by the shaft and rotatable about the shaft from a selectable position to a selected position. The apparatus further includes a retainer selection mechanism, coupled to the frame, that traverses the frame to cause selected ones of the plurality of retainers traversed by the retainer selection mechanism to rotate in sequence from the selectable position to the selected position.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 1A is a plan view of an exemplary embodiment of a disc retainer for storing a disc storage medium in accordance with the present invention;

FIG. 1B is a more detailed view of a portion of the spring arm of the disc retainer of FIG. 1A;

FIG. 2A is a perspective view of one of a plurality of horizontally stacked disc retainers in a selected position with respect to a frame in accordance with the present invention;

FIG. 2B is an enlarged view of a portion of frame in relation to tapered aligning tab of a disc retainer;

DETAILED DESCRIPTION OF ILLUSTRATIVE EMBODIMENT

Figure 2C:
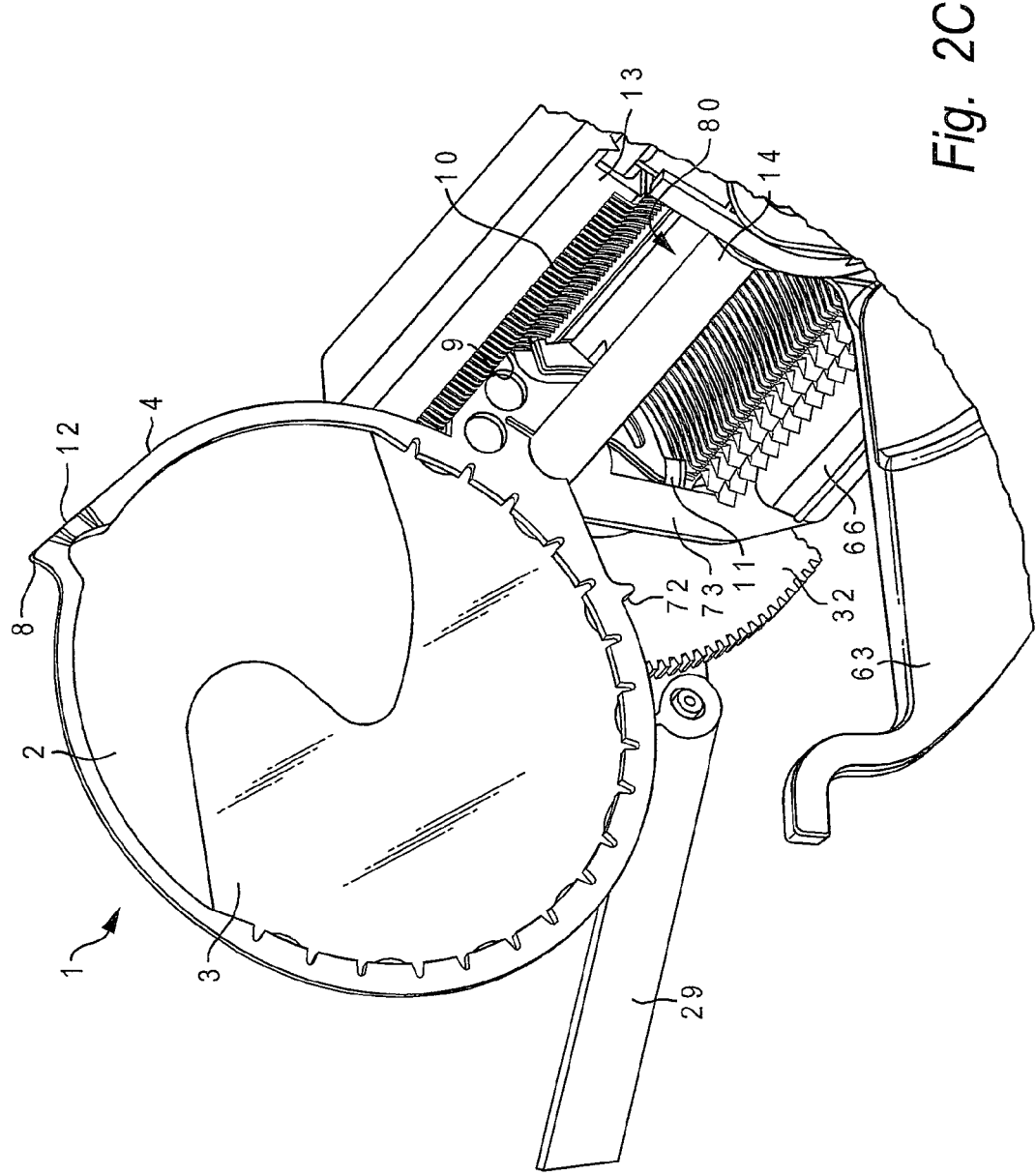
FIG. 2C is a perspective view of one of a plurality of horizontally stacked disc retainers in a selectable position with respect to a frame in accordance with the present invention.

The present invention is directed to a case-less media storage container, which may be utilized to store planar portable storage media, such as CDs and DVDs in a compact horizontal stack that can be easily visually scanned for a planar portable storage medium. In one embodiment, a stack of thin protective disc retainers, each preferably transparent or translucent on at least one side and capable of holding one disc, are pivoted on a common shaft and stored horizontally in an enclosure. When the enclosure is opened, all of the retainers in the horizontal retainer stack are rotated into a selectable position in which the discs can be conveniently viewed from one end. Each retainer in the stack is individually latched to retain the retainer in the selectable position and, within the stack, the face of only the end disc can be seen. Starting at the front of the stack, a sliding retainer selector is moved along the stack, selecting (unlatching) individual retainers that then rotate from the selectable position to a selected position to visually reveal the next disc in the stack. The operator can thus visually browse through the stack according to a desired speed by controlling the movement of the selector. When the desired disc is located the selector is stopped, and the disc can be easily lifted out of the retainer. Also, a single-step-feature allows the stack to be searched one disc at a time. If the operator goes past the desired disc, the operator can re-latch the overshot retainers into the selectable position by hand. In at least one embodiment, retainers can also be restored to the selectable position by lifting a gang restore lever or by simply closing and reopening the enclosure.

With reference now to the figures, wherein like reference numerals refer to like and corresponding parts throughout, and in particular with reference to FIGS. 1A-1B, there are respectively illustrated a front view of an exemplary embodiment of a disc retainer 1 and an enlarged view of a portion 70 of a spring arm 22 of disc retainer 1. In the depicted embodiment, disc retainer 1 has a media-protecting fabric back 2 and a transparent or translucent partial front 3 rigidly attached to a plastic frame 4. Fabric back 2 and partial front 3 together define an arcuate disc storage pocket into which a disc can be inserted (preferably with its top surface facing partial front 3) and from which the disc can easily be retrieved. In other embodiments, disc retainer 1 may alternatively retain a disc on a spindle that engages a central through hole of the disc, as is known in the art. In still other embodiments, disc retainer 1 may retain a disc by engaging its outer edges.

Frame 4 has a latch surface 5, a partial pivot hole 6, an aligning tab 7a or 7b, a restore tab 8, guide tabs 9, 10 and 11, and a numbering surface 12, which preferably bears a number or other ordering indicia. In one exemplary embodiment, even numbered disc retainers within the horizontal stack have an aligning tab 7a (and no tab 7b), and odd numbered disc retainers within the horizontal stack have an aligning tab 7b (and no tab 7a). Disc retainer 1 further includes an integral spring arm 22 on the opposite side of partial pivot hole 6 from the disc storage pocket. As best seen in FIG. 1B, end portion 70 of spring arm 22 includes front surface 40, as well as previously discussed latch surface 5 and guide slot tab 10.

Referring now to FIGS. 2A and 2B, there are depicted a perspective view of one of a plurality of horizontally stacked disc retainers 1 in relation to a frame 13 and an enlarged view of a portion 71 of frame 13 in relation to tapered aligning tab 7b of an odd numbered disc retainer 1. As shown in FIG. 2A, frame 13, which may be formed of injection molded plastic, has a plurality of vertically oriented and evenly spaced aligning slots 15 formed therein for guiding guide tabs 9, 10 and 11 of a corresponding plurality of disc retainers 1 to maintain the disc retainers 1 in evenly spaced relation. Frame 13 also has formed there through a horizontal, substantially central slot 80 that divides each aligning slot 15 into upper and lower portions. Guide tabs 9 and 10 of the frame 4 of disc retainer 1 cooperate with the upper portion of an aligning slot 15, and guide tab 11 cooperates with the lower portion of the aligning slot 15, as best seen in FIG. 2C.

Disposed below aligning slots 15 of frame 13 are upper and lower racks 41a and 41b, respectively. As most clearly seen in FIG. 2B, lower rack 41a comprises a plurality of evenly spaced tapered teeth 72 corresponding in number and location to even numbered disc retainers 1 within the horizontal stack, and upper rack 41b comprises a plurality of evenly spaced tapered teeth 72 corresponding in number and location to odd numbered disc retainers 1 within the horizontal stack.

As further shown in FIG. 2A, spaced apart from aligning slots 15 and supported by frame 13 is a shaft 14. Each disc retainer 1 in a horizontal stack comprising multiple disc retainers 1 is mounted on and is rotatable about shaft 14 at the partial pivot holes 6 of the disc retainers 1 between at least a selectable position and a selected position. Gravity biases disc retainers 1 counterclockwise (i.e., downward) about shaft 14 in the illustrated selected position. When in the selected position, tapered aligning tab 7b of disc retainer 1 engages a tapered tooth 72 of rack 41b, thus aligning disc retainer 1 in a predetermined horizontal location (see FIG. 2B).

FIG. 2A further illustrates a restore bar 66 that is suspended from shaft 14 by arms 73 (only one of which is shown) that are coupled to and rotatable about shaft 14. Restore bar 66 is coupled to a gang restore arm 63 that, when manually lifted, rotates disc retainers 1 spanned by restore bar 66 from the selected position depicted in FIG. 2A into the selectable position illustrated in FIG. 2C.

For ease of manufacturing media storage containers of differing sizes, frame 13 may be sized to accommodate a predetermined maximum number of disk retainers 1 (e.g., 50 disc retainers 1 in the embodiment of FIG. 2A), and multiple frames 50 may be ganged together as shown in FIG. 2A to accommodate multiples of that predetermined maximum number. If multiple frames 13 are ganged together, the frames 13 may share a common shaft 14 and a common restore bar 66, or alternatively, each frame 13 may have its own shaft 14 and restore bar 66.

Figure 3A:
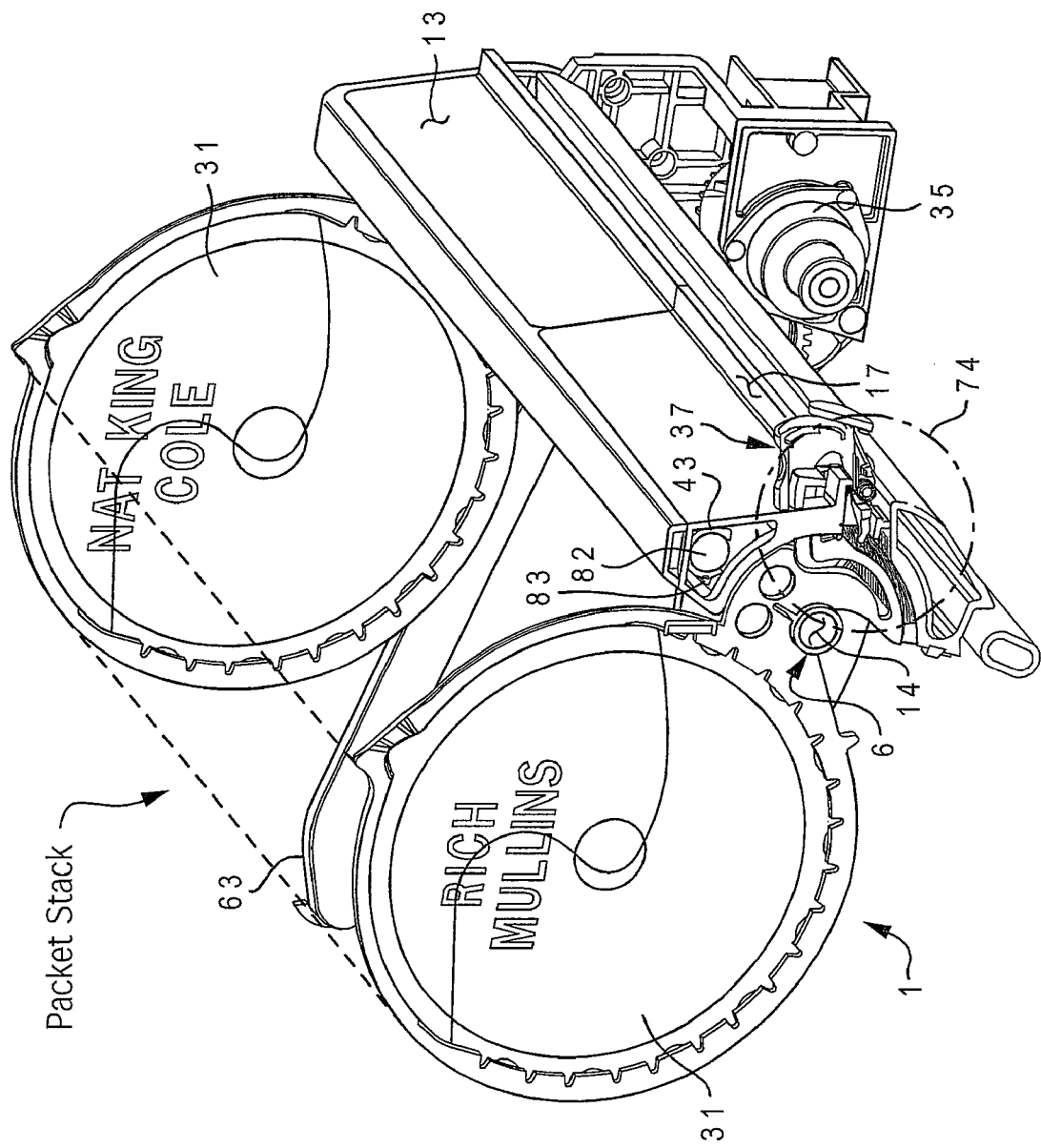
FIG. 3A is a section view of a frame in relation to a plurality of horizontally stacked disc retainers.
Figure 3B:
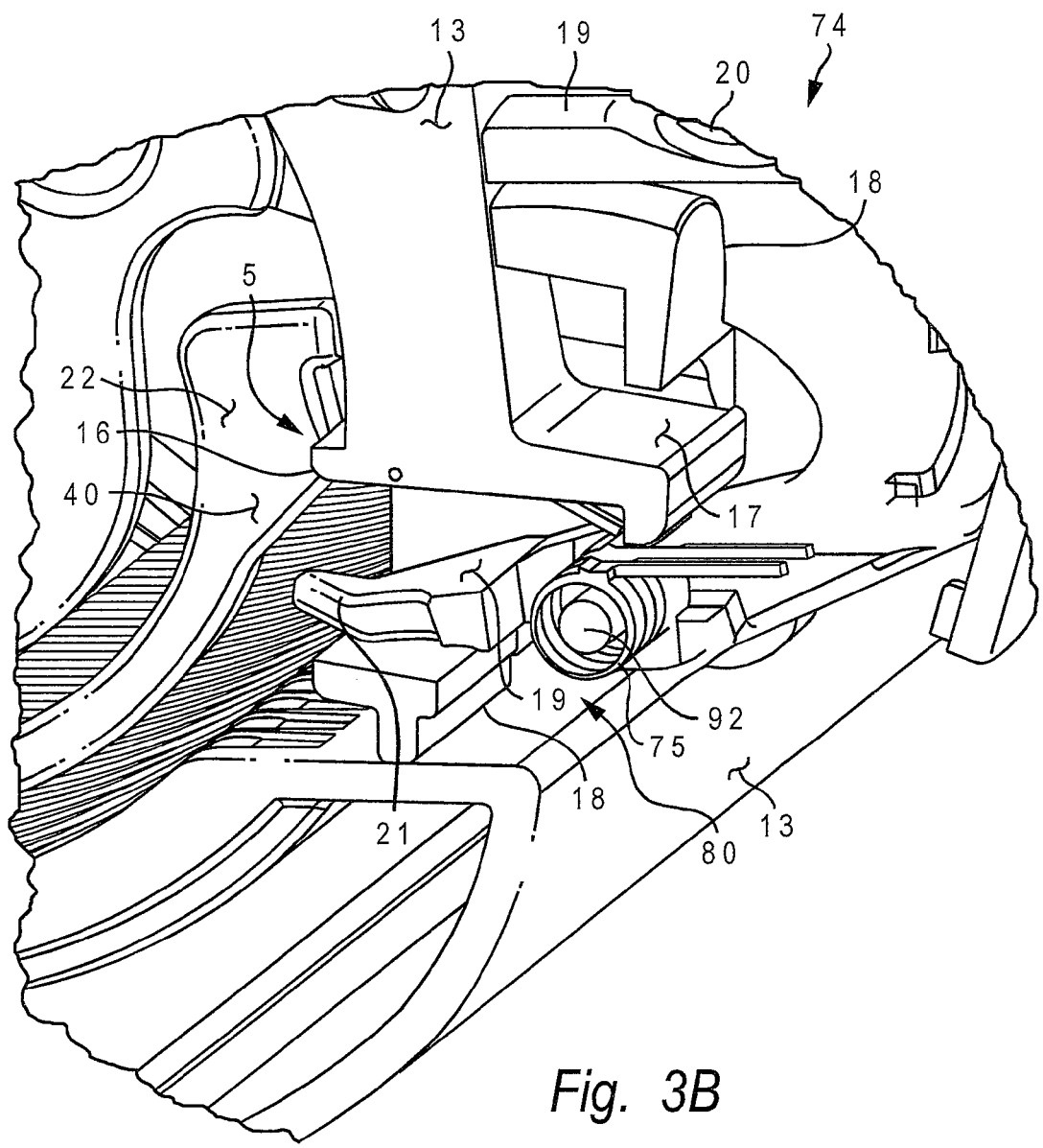
FIG. 3B is an enlarged view of a portion of the frame in relation to a retainer selection mechanism.
Figure 3C:
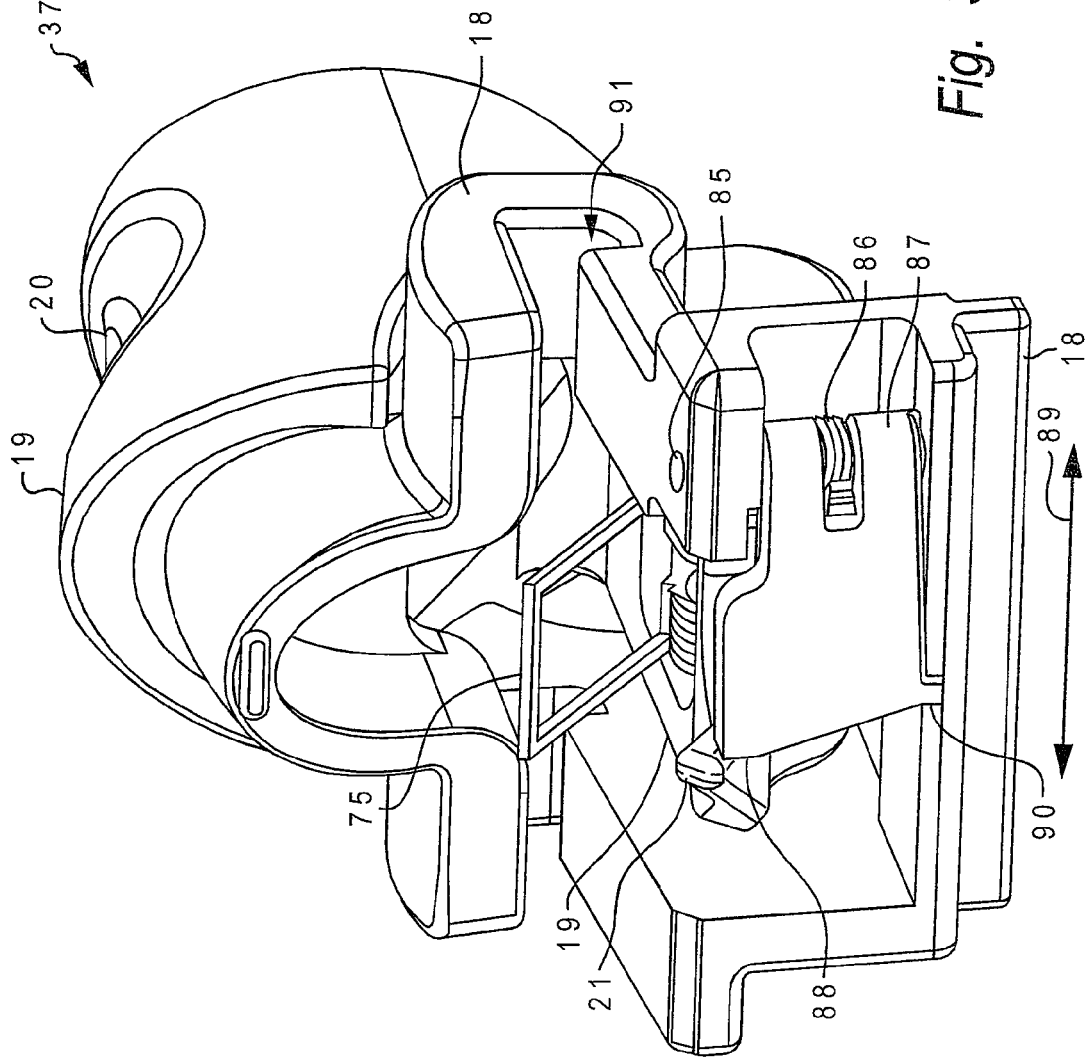
FIG. 3C is an isolated view of a the retainer selection mechanism depicted in FIG. 3B.

With reference now to FIGS. 3A-3C, there are illustrated a section view of frame 13 in relation to a plurality of horizontally stacked disc retainers 1, an enlarged section view of a portion 74 of frame 13 in relation to a retainer selection mechanism, and an isolated view of the retainer selection mechanism, respectively. Referring first to FIG. 3A, the plurality of horizontally stacked disc retainers 1 are again shown mounted on shaft 14 at the partial pivot holes 6 of the disc retainers 1. In this view, however, each disc retainer 1 is restrained in the depicted selectable position by the engagement of its latch surface 5 by a horizontally-oriented projecting latch surface 16 of frame 13.

Frame 13 further includes a rail 17 projecting from an opposite surface of frame 13 from latch surface 16. As best seen in FIG. 3B, rail 17 supports and constrains to translational movement a retainer selection mechanism 37.

FIG. 3C is a perspective view of retainer selection mechanism 37 in isolation. In the depicted embodiment, retainer selection mechanism 37 includes a slider frame 18 that receives rail 17 within a channel 91 formed in slider frame 18. By this arrangement, slider frame 18 is constrained to bi-directional horizontal movement along rail 17 of frame 13, as indicated by arrow 89. To permit a single retainer selection mechanism 37 to be employed for multiple ganged frames 13, slots 80 of the frames 13 are preferably open ended.

Mounted on slider frame 18 is stop member 87, which is pivotally attached to slider frame 18 about pin 85. (For clarity, stop member 87 is not shown in the section view of FIG. 3B). A low-force torsion spring 86 biases stop member 87 in a counter-clockwise (CCW) direction restrained by tab 90 on slider frame 18.

Slider frame 18 supports a selector 19 having a pair of pins 92 (only one of which is illustrated) journaled in slider frame 18 such that selector 19 is rotatable under digital exertion about pins 92 against the urging of spring 75. Selector 19 includes a finger recess 20 to facilitate digital manipulation. Selector 19 further includes a foot 21 that, as shown in FIG. 3B, extends through slot 80 in frame 13.

To select a disc retainer 1 and thus cause the disc retainer 1 to rotate from the selectable position shown in FIGS. 3A and 2C to the selected position shown in FIG. 2A, a user positions retainer selection mechanism 37 along rail 17 of frame 13 at the front of the stack of disc retainers 1. The user then slides retainer selection mechanism 37 along rail 17 toward the first disc retainer 1 in the retainer stack. If retainer selection mechanism 37 is then translated along rail 17 without selector 19 being depressed, surface 88 of stop member 87 interferes with front surface 40 of spring arm 22 of the first disc retainer 1, stopping the travel of retainer selection mechanism 37 at the first disc retainer 1. The user can then manually depress selector 19 at finger recess 20, causing selector 19 to rotate downward with respect to slider frame 18 against the upward urging of spring 75. As selector 19 is rotated, foot 21 of selector 19 engages front surface 40 of the spring arm 22 of disc retainer 1, pushing latch surface 5 off of latch surface 16.

When latch surfaces 5 and 16 are thus freed from engagement, the selected disc retainer 1 rotates about shaft 14 under gravitational urging into the selected position of FIG. 2A. By selecting the first disc retainer 1 in this manner, the second disc retainer 1 and the disc 31 housed therein within the horizontal disc stack are revealed for visual inspection and possible removal of disc 31.

If selector 19 is now manually released according to a single step selection procedure and retainer selection mechanism 37 is pushed farther along the horizontal disc stack, then surface 88 of stop member 87 will stop retainer selection mechanism 37 at the second disc retainer 1, which can be similarly selected. By repeating this single step selection procedure, the user can easily single step through the horizontal retainer stack from front to back one disc retainer 1 at a time.

Following selection of the first disc retainer 1 in the horizontal disc stack, the user may alternatively retain selector 19 in a depressed position while translating retainer selection mechanism 37 toward the back of the horizontal retainer stack. In this case, foot 21 engages the front surface 40 of adjacent disc retainers 1 in sequence, causing them to fall from the selectable position toward the selected position one after another under the urging of gravity without stop member 87 halting translation of retainer selection mechanism 37. The speed that the user browses the horizontal stack of disc retainers 1 thus depends on the speed the user translates slider frame 18 along rail 17 with selector 19 depressed.

In a preferred embodiment, spring 86 operating on stop member 87 is preferably of such a low force that retainer selection mechanism 37 can be moved from the back of the horizontal disc stack 1 to the front at any time without unlatching any disc retainers 1 because stop member 87 will rotate clockwise out of the way.

Figure 4:
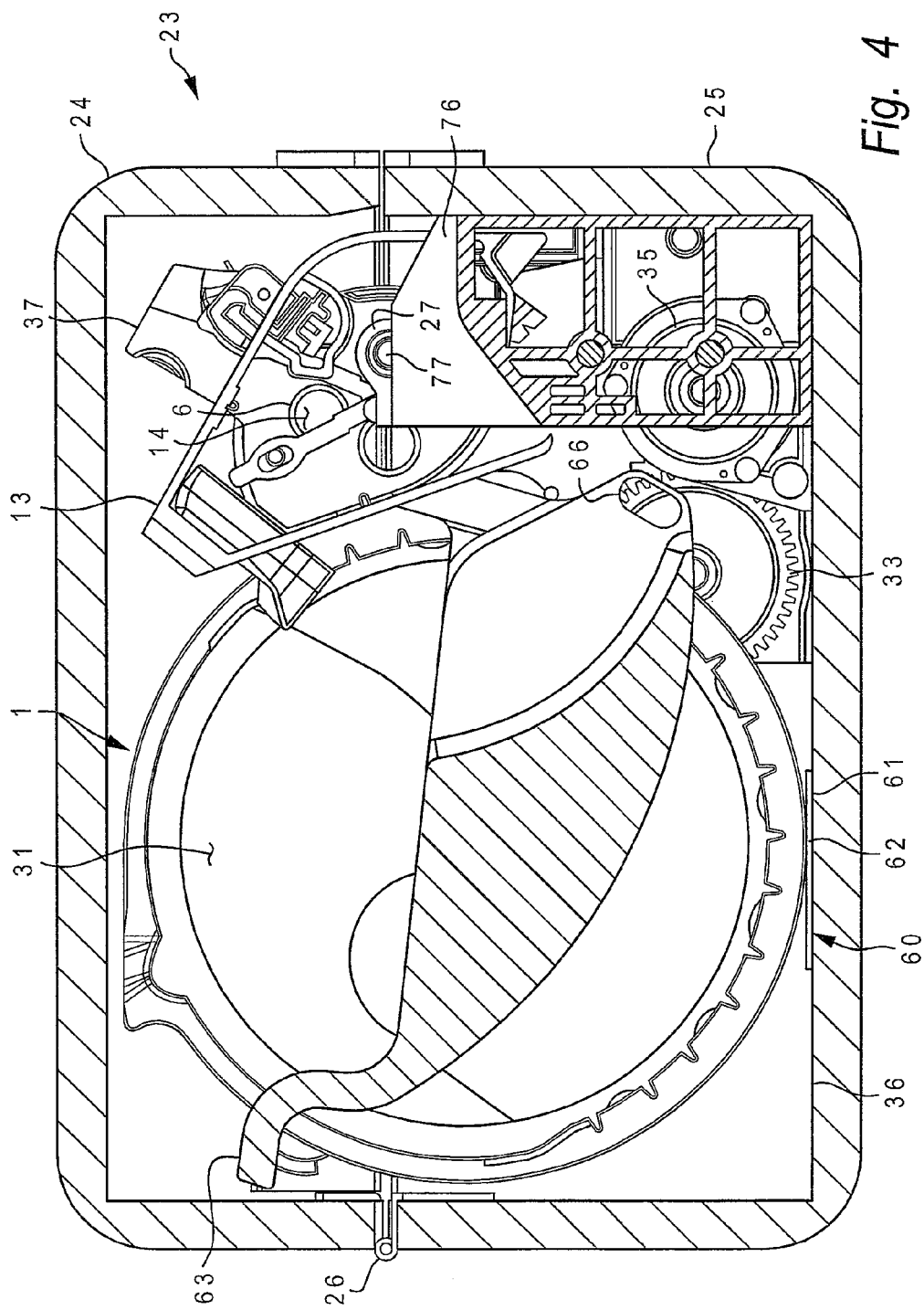
FIG. 4 is a section of an exemplary case-less media storage container in a closed position viewed from a first side.
Figure 5:
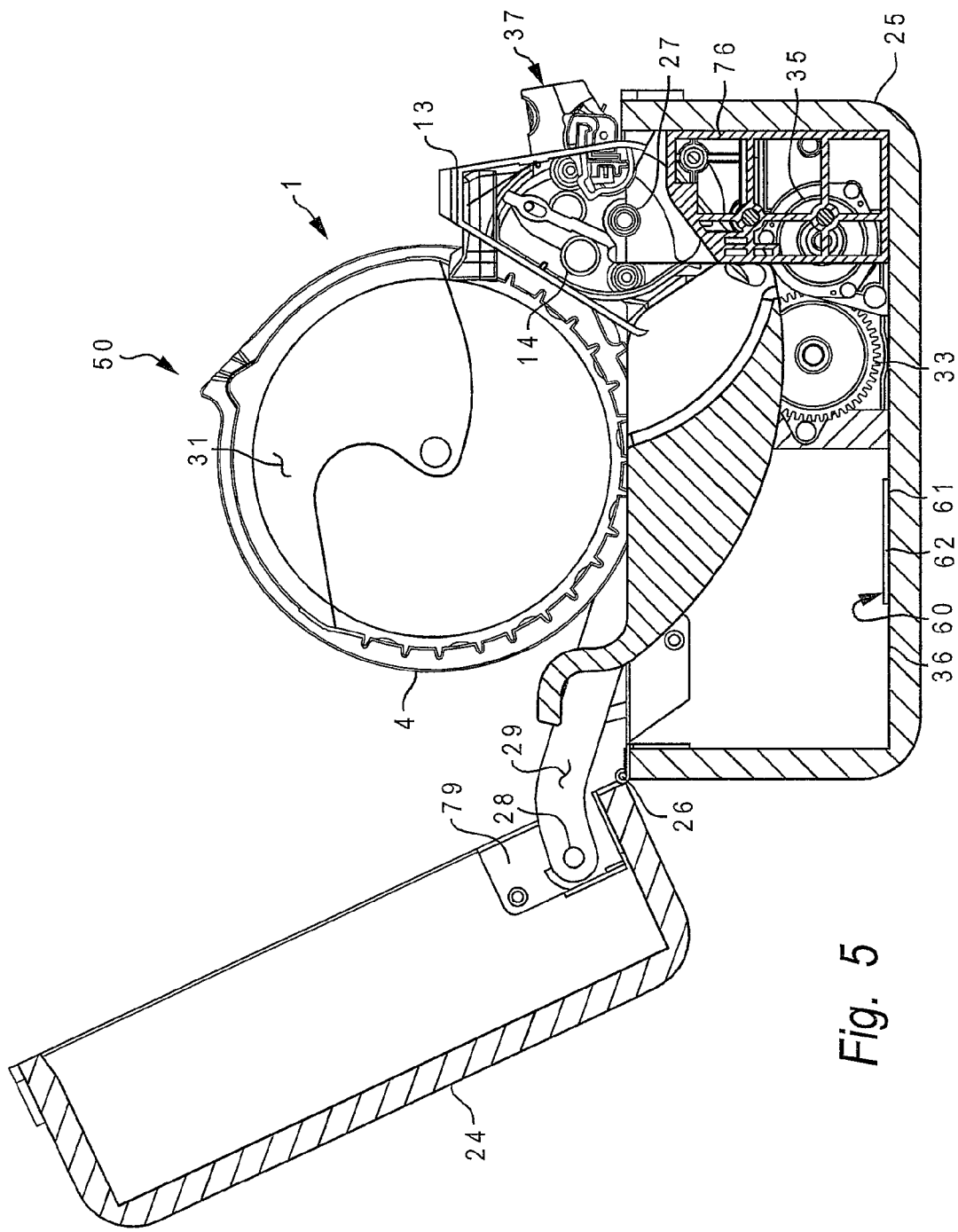
FIG. 5 is a section of the exemplary case-less media storage container in an open position viewed from the first side.

Referring now to FIGS. 4-5, there are depicted sectional views of an exemplary embodiment of a case-less media storage container 23 housing a media storage apparatus as previously described. FIGS. 4 and 5 are sectional views from a first side of case-less media storage container 23 in closed and open positions, respectively, and FIGS. 6 and 7 are sectional views from an opposing second side of case-less media storage container 23 in closed and open positions, respectively.

Figure 6:
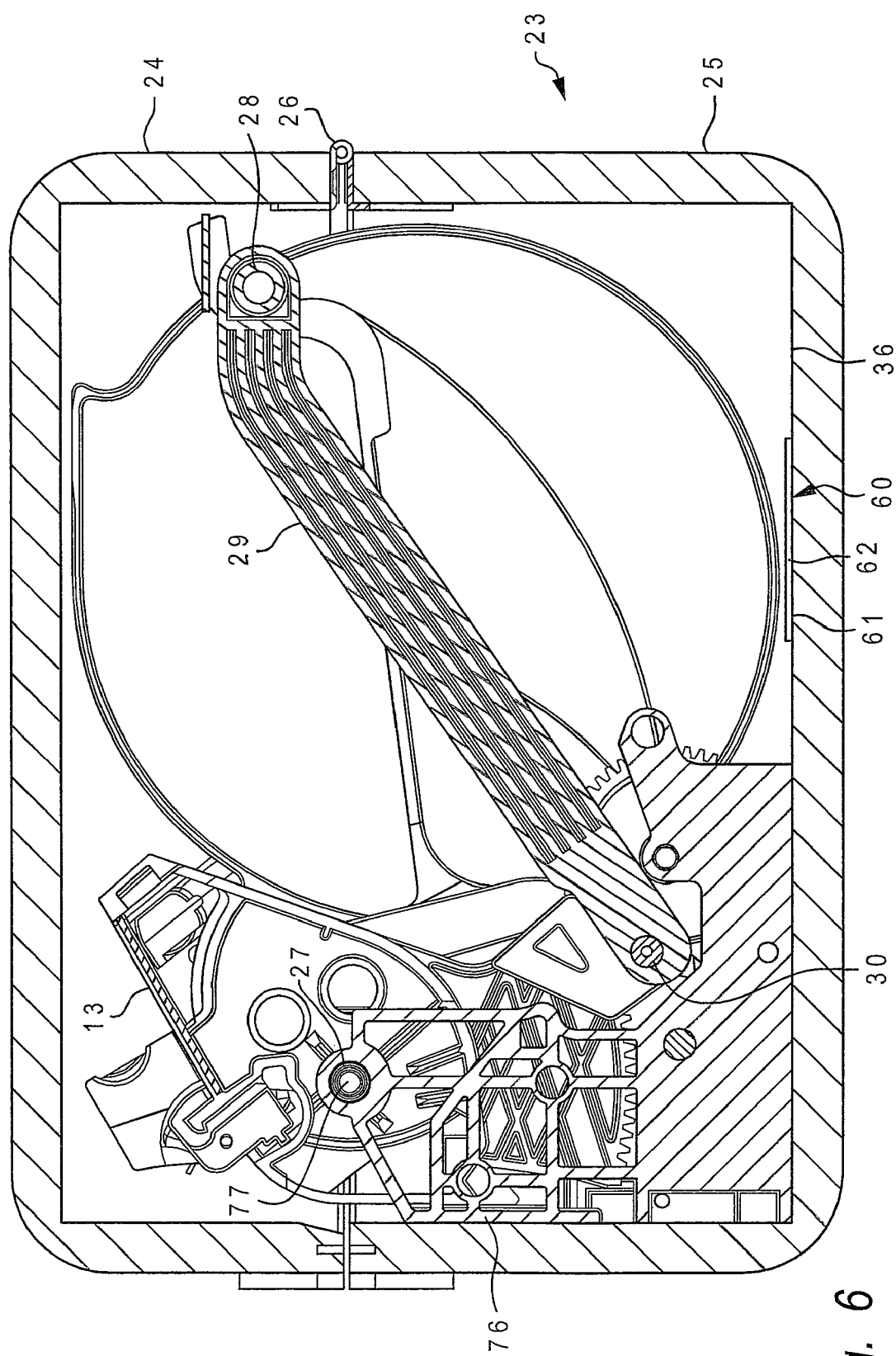
FIG. 6 is a section of an exemplary case-less media storage container in the closed position viewed from a second side.
Figure 7:
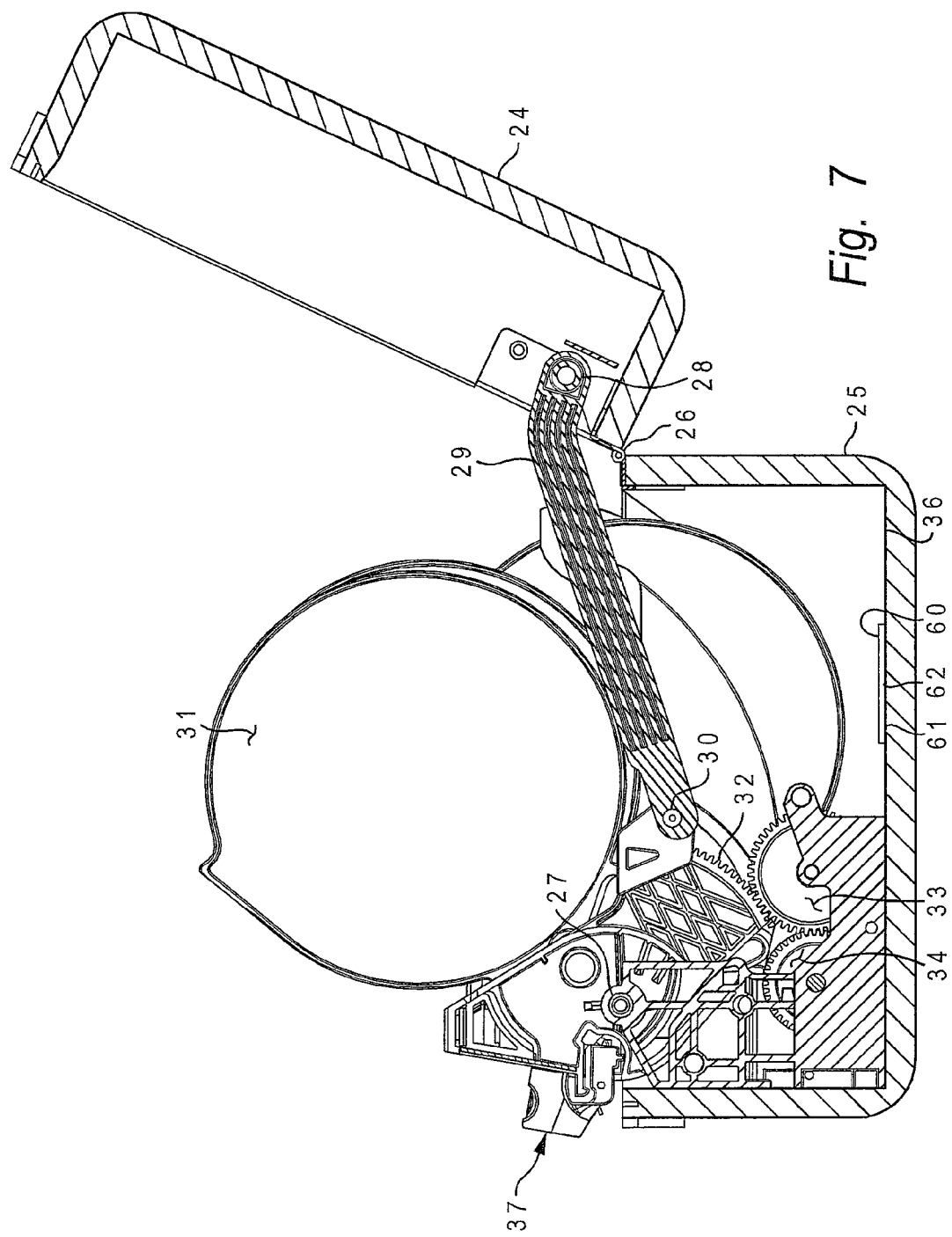
FIG. 7 is a section of the exemplary case-less media storage container in the open position viewed from the second side.

In the depicted embodiment, case-less media storage container 23 is realized as a six-sided box including a base portion 25 and a lid 24 that is coupled by hinge 26 (or hinges) to base portion 25 so that lid 24 may be closed to enclose a horizontal stack of disc retainers 1 (as shown in FIGS. 4 and 6) or opened to reveal the horizontal stack of disc retainers 1 (as shown in FIGS. 5 and 7). Case-less media storage container 23 may be formed of plastic, metal, wood, or other appropriate rigid material. It will be appreciated that any desired industrial design or decorative treatment may be applied to the exterior of case-less media storage container 23 to achieve the desired aesthetic appearance.

Within case-less media storage container 23, a pair of frame support 76, which may be formed of injection molded plastic, are attached to opposing interior surfaces of base portion 25. Each frame support 76 has a socket 27 formed therein that supports frame 13 by a respective one of a pair of ears 77 integral to frame 13 and that permits frame 13 to rotate with respect to frame supports 76. As shown in FIG. 2A, the coupling of frame 13 to frame support 76 may optionally be hidden from view by a decorative shroud 78.

As best seen in FIGS. 5 and 7, lid 24 has a bracket 79 attached thereto. Bracket 79 has an integral lift pin 28 to which a first end of a linkage 29 is pivotally attached. The second end of linkage 29 is attached to a lift pin 30 on frame 13, as shown in FIGS. 6 and 7. By virtue of this linkage 29, when a user manually opens lid 24 as shown in FIGS. 5 and 7, the horizontal stack of disc retainers 1 is rotated upward to expose most or all of the face of the disc 31 in the first disc retainer 1 in the horizontal stack. The user can then browse the horizontal stack from front to back as previously described. As disc retainers 1 are selected, the disc retainers 1 drop from the selectable position into base portion 25 under gravitational urging.

As shown in FIGS. 2 and 4-7, case-less media storage container 23 may optionally include a dampening apparatus for dampening movement of lid 24. In the depicted embodiment, the dampening apparatus includes a gear segment 32 rigidly attached to frame 13, a first gear 33 rotatably attached to one of frame supports 76 and/or base portion 25 and enmeshed with gear segment 32, a silicon-grease dampener assembly 35 attached to the frame support 76 and/or base portion 25, and a second gear 34 enmeshed with first gear 33 and coupled to silicon-grease dampener assembly 35 for co-rotation therewith. When linkage 29 rotates frame 13 clockwise or counter, gear segment 32 turns first gear 33, which in turn rotates second gear 34 and silicon-grease dampener assembly 35. The rotational resistance provided by silicon-grease dampener assembly 35 controls within a desired limit the velocity of the opening and closing of lid 24. Such dampening is desirable because of the potentially significant weight of the horizontal stack of disc retainers 1, which may hold 100 or more discs 31.

FIGS. 4-7 further illustrate that case-less media storage container 23 optionally but preferably includes a pad 60 disposed on the interior bottom surface of base portion 25. Pad 60, which may span some or all of the interior bottom surface, extends at a minimum between a resting location 62 at which disc retainers 1 contact pad 60 when lid 24 is closed and an impact location 61 at which selected disc retainers 1 contact pad 60 when lid 24 is open. Because shaft 14 and the frame socket 27 are offset, closing lid 24 moves linkage 29, which rotates shaft 14 about socket 27, causing previously selected disc retainers 1 to slide from impact location 61 to resting location 62. The surface of pad 60 is preferably covered with a low friction material to reduce the force necessary to slide disc retainers 1 from impact location 61 to resting location 62.

While lid 24 is moving from the open position to the closed position, latch surface 16 also rotates counter-clockwise about socket 27, and since pad 60 prohibits rotation of previously selected disc retainers 1, the latch surface 5 of the previously selected retainers 1 will eventually be re-engaged with latch surface 16. Consequently, when lid 24 is completely closed, all disc retainers 1 are latched, and the entire horizontal retainer stack will be lifted out of the case-less media storage container 23 when lid 24 is opened again. In addition to closing and reopening case-less media storage container 23 to relatch disc retainers 1 and return them to the selectable position, a user can manually lift one or more disc retainers 1 by their restore tabs 8 or lift gang restore arm 63 to restore all selected disc retainers 1 to the selectable position.

To maximize the storage capacity of case-less media storage container 23, disc retainers 1 are preferably spaced close enough so that adjacent disc retainers 1 touch and exert frictional drag on each other. However, in embodiments in which disc retainers 1 touch, selected disc retainers 1, and particularly empty disc retainers 1, will not drop into base portion 25 under only gravitational force without careful design. The disclosed embodiment allows disc retainers 1 (even those that are empty) to move from the selectable position to the selected position under only gravitational force, thus permitting high storage density. To achieve this, the frictional drag on the back of a selected disc retainer 1 by the adjacent unselected disc retainer 1 is reduced or eliminated, and the frictional drag on the front of a selected disc retainer 1 by the adjacent previously selected disc retainer 1 is also reduced or eliminated.

To reduce or eliminate the frictional drag exerted on the back of a selected disc retainer 1 by the adjacent unselected disc retainer 1, a preferred embodiment of the present invention tilts the selected disc retainer 1 slightly forward (i.e., toward the front of the horizontal stack) during selection. Tilting of the selected disc retainer 1 is achieved by foot 21 of selector 19 striking front surface 40 as slider frame 18 is translated along rail 17 toward the back of the horizontal stack. The force of foot 21 contacting front surface 40 provides a torque that rotates the disc retainer 1 thus selected about line A-A shown in FIG. 1A. This motion pulls the selected disc retainer 1 away from the immediately adjacent disc retainer 1 that follows the selected disc retainer 1 in the horizontal stack. Thus, when latch surface 5 cams off of latch surface 16, the selected disc retainer 1 is free to rotate down into base portion 25, revealing the next disc retainer 1 in the stack.

Figure 8:
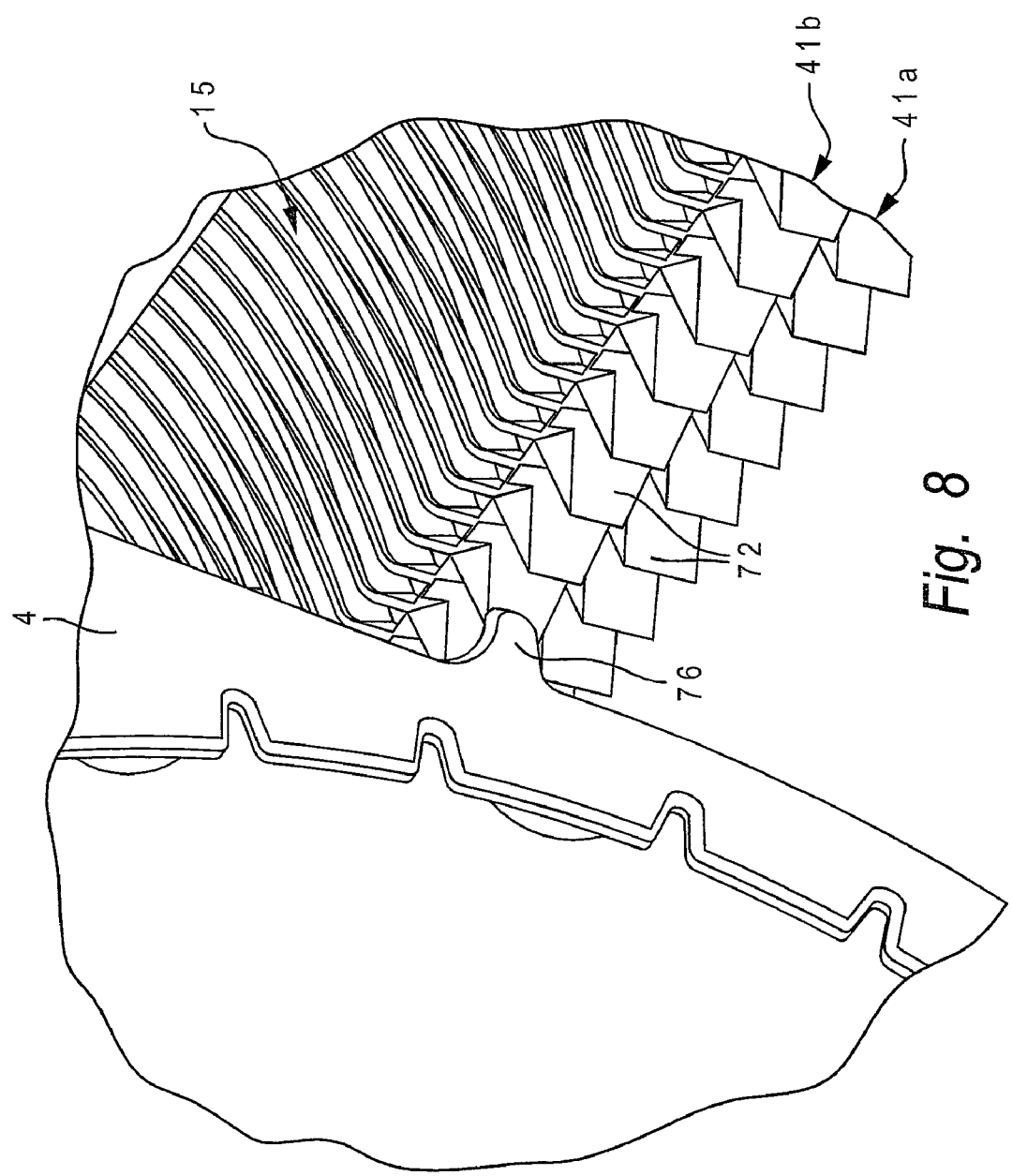
FIG. 8 is a detailed view of an aligning tab of a disc retainer contacting a tapered tooth of a rack on a frame in accordance with the present invention.
Figure 9:
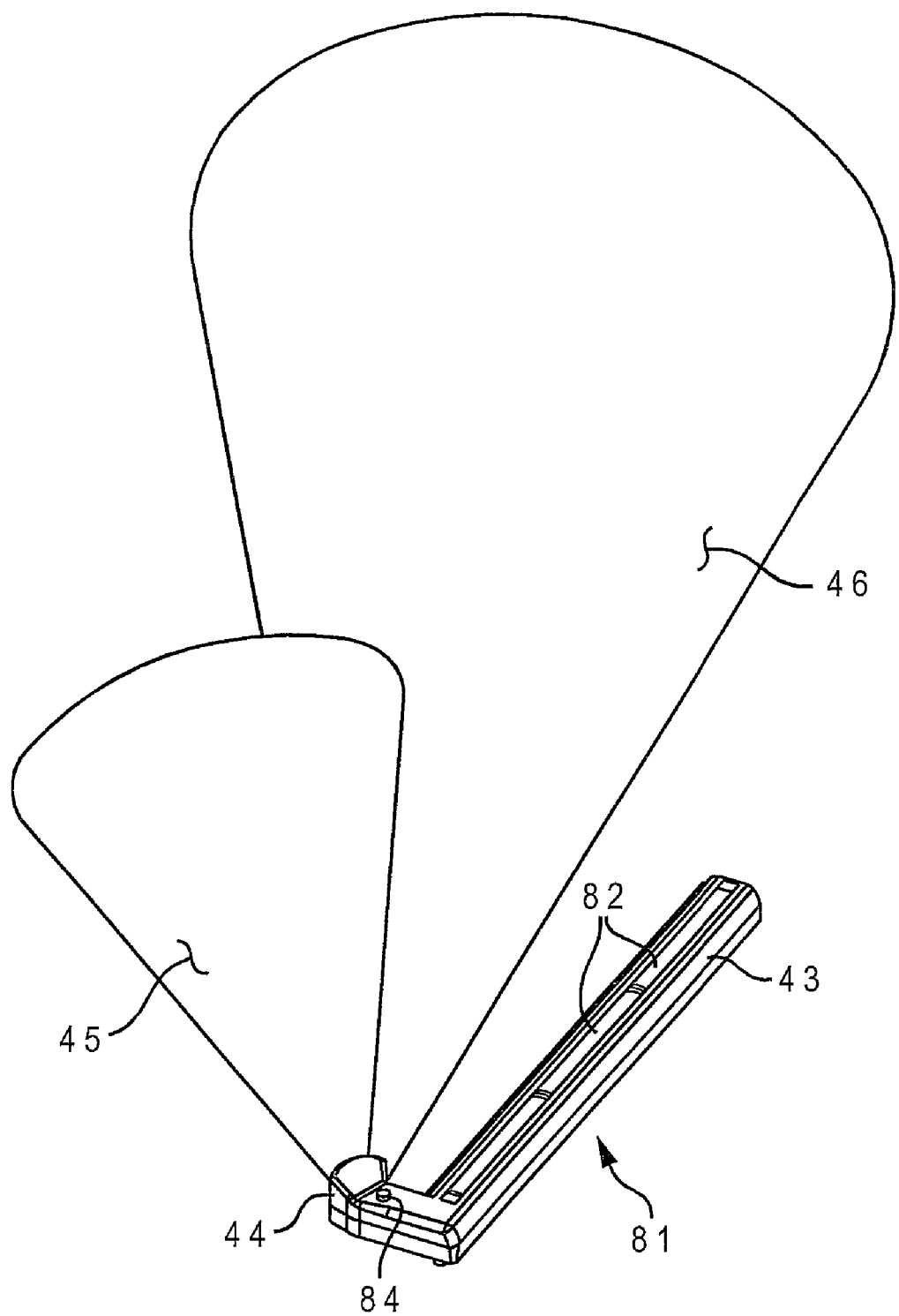
FIG. 9 depicts an exemplary illumination assembly for a case-less media storage container in accordance with the present invention.

The frictional drag on the front of a selected disc retainer 1 by the adjacent previously selected disc retainer 1 is also reduced or eliminated by the design of the racks 41a, 41b previously described. As shown in FIG. 8 with respect to an even numbered selected disc retainer 1, when a selected disc retainer 1 falls into base portion 25, its tapered aligning tab 7b strikes the corresponding tapered tooth 72 in rack 41b near the apex. The tapered or inclined-plane shape of tapered tooth 72 naturally drives the selected disc retainer 1 forward into the position shown in FIG. 2B in which the selected disc retainer 1 is tightly packed against the previously selected adjacent disc retainer 1. As a result, the subsequent disc retainer 1, if selected, has sufficient space to freely fall into base portion 25. It will be appreciated that the use of multiple offset racks 41a, 41b as shown achieves a tighter spacing of selected disc retainers 1 and a wider gap from the unselected disc retainers 1 than can be achieved by a single rack of comparable tooth size and spacing.

The tilting of selected disc retainers 1 and the use of rack(s) 41 to increase the gaps between a particular disc retainer 1 and unselected and previously selected disc retainers 1 thus creates a pair of moving gaps in a tightly spaced horizontal retainer stack that decreases or eliminates frictional forces exerted by adjacent retainers on the selected disc retainer 1, allowing the selected disc retainer 1 to fall to the selected position under only gravitational force.

In order to facilitate viewing and selection of discs 31, case-less media storage container 23 may optionally include a lighting system that illuminates discs 31 within the horizontal stack of disc retainers 1. FIGS. 2 and 11 respectively depict installed and uninstalled views of a lighting assembly 81 for illuminating the retainer stack. Lighting assembly 81 includes a shaft 43 housing a battery pack comprising one or more batteries 82. Lighting assembly 81 further includes a head 44 containing one or more light sources, such as light-emitting diodes (LEDs) that are electrically coupled to and powered by the battery pack disposed within shaft 43. In a preferred embodiment, head 44 contains at least two light sources appropriately oriented to illuminate a first region 45 including the first disc retainer 1 in the retainer stack and a second region 46 including the last disc retainer 1 in the retainer stack. The light sources may be turned on and off by manipulation of a manual switch 84.

It will be appreciated that lighting assembly 81 can be installed in various locations within case-less media storage container 23, including on or integral to an interior surface of lid 24. However, in one preferred embodiment depicted in FIGS. 2A and 3A, shaft 43 of lighting assembly 81 is housed within a channel 83 in frame 13, with head 44 of lighting assembly 81 extending outwardly at an angle therefrom. Switch 84 is exposed so that the light sources can easily be turned on and off.

As has been described, the present invention provides improved methods, apparatus and systems for media storage. In one embodiment, a case-less media storage container contains a plurality of disc retainers that may be utilized to store planar portable storage media, such as CDs and DVDs in a compact horizontal stack. The disc retainers within the horizontal stack are rotated into a selectable position in which the discs can be conveniently viewed from one end when the storage container is opened. Each retainer in the stack is individually latched to retain the retainer in the selectable position and, within the stack, the face of only the end disc can be seen. Starting at the front of the stack, a sliding retainer selector is moved along the stack, selecting (unlatching) individual retainers that then rotate from the selectable position to a selected position to visually reveal the next disc in the stack. The operator can thus visually browse through the stack according to a desired speed by controlling the movement of the selector. Identifying a particular disc can be facilitated by an optional lighting assembly within the storage container.

While the invention has been particularly shown as described with reference to a preferred embodiment, it will be understood by those skilled in the art that various changes in form and detail may be made therein without departing from the spirit and scope of the invention.

What is claimed is:

1. A media storage apparatus, comprising:
a frame;
a shaft;
a plurality of retainers for retaining a plurality of portable planar storage media, wherein each of the plurality of retainers is supported by the shaft and is individually rotatable orthogonally to the shaft between a raised selectable position and a lowered selected position, wherein the plurality of retainers are aligned along the frame to form a stack on a first side of the frame;

a lift mechanism that lifts all of the plurality of retainers in the lowered selected position to the raised selectable position; and a retainer selection mechanism, coupled to the frame, that traverses the frame past multiple ones of the plurality of retainers to cause selected ones of the plurality of retainers traversed by the retainer selection mechanism to rotate orthogonally to the shaft from the raised selectable position to the lowered selected position, wherein the frame has a slot formed there through that spans said stack, and wherein the retainer selection mechanism includes a selector that has a manually manipulable element slidable along a second side of said frame and that extends into said slot to contact the selected ones of the plurality of retainers.

2. The media storage apparatus of claim 1, wherein:

the stack comprises a substantially horizontal stack; and the selected ones of the plurality of retainers move from the raised selectable position to the lowered selected position under only the urging of gravity.

3. The media storage apparatus of claim 1, wherein:

said frame has a plurality of aligning slots formed therein that cooperate with the plurality of retainers to space the plurality of retainers.

4. The media storage apparatus of claim 1, and further comprising an enclosure for the frame and plurality of retainers.

5. The media storage apparatus of claim 4, wherein said enclosure includes a base portion and a lid that is openable to permit access to the plurality of retainers and closeable to enclose the plurality of retainers.

6. A media storage apparatus, comprising:

a frame;

a shaft;

a plurality of retainers for retaining a plurality of portable planar storage media, wherein each of the plurality of retainers is supported by the shaft and is individually rotatable orthogonally to the shaft between a raised selectable position and a lowered selected position;

a lift mechanism that lifts all of the plurality of retainers in the lowered selected position to the raised selectable position;

a retainer selection mechanism, coupled to the frame, that traverses the frame past multiple ones of the plurality of retainers to cause selected ones of the plurality of retainers traversed by the retainer selection mechanism to rotate orthogonally to the shaft from the raised selectable position to the lowered selected position; and an enclosure for the frame and plurality of retainers, wherein said enclosure includes a base portion and a lid that is openable to permit access to the plurality of retainers and closeable to enclose the plurality of retainers;

wherein in said raised selectable position, a retainer among the plurality of retainers extends at least partially out of said base portion, and in said lowered selected position, the retainer is substantially disposed within the base portion.

7. The media storage apparatus of claim 6, and further comprising:

frame supports within the enclosure that pivotally support the frame; and a linkage coupling the lid and the frame, such that opening the lid raises the frame from within the base portion and initializes all of the plurality of retainers to the raised selectable position.

8. The media storage apparatus of claim 4, further comprising a lighting system within the enclosure.

9. The media storage apparatus of claim 1, wherein:

said plurality of portable planar storage media comprises a plurality of discs; and each of said plurality of retainers include a pocket for retaining a respective disc.

10. The media storage apparatus of claim 1, wherein:

said frame comprises a first frame;

said plurality of retainers comprises a first plurality of retainers; and said media storage apparatus further comprises a second frame ganged together with said first frame and supporting a second plurality of retainers.

11. The media storage apparatus of claim 1, wherein:

the stack has a front end and a back end; and the retainer selection mechanism causes the selected ones of the plurality of retainers traversed by the retainer selection mechanism to move from the raised selectable position to the lowered selected position unless the retainer selection mechanism is traversing the frame from the front end of the stack to the back end of the stack.

12. A media storage apparatus, comprising:

a frame;

a shaft;

a plurality of retainers for retaining a plurality of portable planar storage media, wherein each of the plurality of retainers is supported by the shaft and is individually rotatable orthogonally to the shaft between a raised selectable position and a lowered selected position;

a lift mechanism that lifts all of the plurality of retainers in the lowered selected position to the raised selectable position;

a retainer selection mechanism, coupled to the frame, that traverses the frame past multiple ones of the plurality of retainers to cause selected ones of the plurality of retainers traversed by the retainer selection mechanism to rotate orthogonally to the shaft from the raised selectable position to the lowered selected position, wherein the retainer selection mechanism includes:

a slider frame that traverses the frame; and a selector rotatable on the slider frame between a first position and a second position, wherein the retainer selection mechanism only selects the selected ones of plurality of retainers when the selector is in the second position.

13. The media storage apparatus of claim 12, wherein the retainer selection mechanism further includes a stop member that interferes with disc retainers in the raised selectable position when the selector is in the first position.

14. The media storage apparatus of claim 1, wherein selection of a retainer among the plurality of retainers by the retainer selection mechanism separates the selected retainer from an adjacent retainer among the plurality of retainers.

15. The media storage apparatus of claim 1, wherein the frame includes a rack that spaces selected retainers in the lowered selected position from unselected retainers in the raised selectable position.

16. The media storage apparatus of claim 15, wherein:

the rack comprises a first rack; and the frame includes a second rack offset from the first rack.

17. A method of browsing a plurality of portable planar storage media in an enclosure that encloses for a plurality of retainers when the enclosure is closed and exposes the plurality of retainers when the enclosure is open, the method comprising:

retaining the plurality of portable planar storage media with the plurality of retainers, wherein the plurality of retainers are rotatable orthogonally to a shaft between a raised selectable position and a lowered selected position;

initializing all of the plurality of retainers to the raised selectable position by opening the enclosure;

restraining the plurality of retainers in the raised selectable position utilizing a frame; and selecting selected retainers among the plurality of retainers utilizing a retainer selection mechanism that traverses the frame, wherein selection of the selected retainers causes the selected retainers to rotate orthogonally to the shaft from the raised selectable position to the lowered selected position.

* * * * *